(12) United States Patent
Liu

(10) Patent No.: US 11,317,350 B2
(45) Date of Patent: Apr. 26, 2022

(54) METHOD AND DEVICE FOR ADJUSTING DRX-RELATED PARAMETER

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/076,246

(22) Filed: Oct. 21, 2020

(65) Prior Publication Data

US 2021/0037473 A1 Feb. 4, 2021

Related U.S. Application Data

(63) Continuation of application No. PCT/CN2018/089254, filed on May 31, 2018.

(51) Int. Cl.
*H04W 52/02* (2009.01)
*H04W 76/28* (2018.01)

(52) U.S. Cl.
CPC ... *H04W 52/0235* (2013.01); *H04W 52/0261* (2013.01); *H04W 76/28* (2018.02)

(58) Field of Classification Search
CPC ......... H04W 52/0225; H04W 52/0235; H04W 52/0261; H04W 76/28
USPC ....................................................... 370/311
See application file for complete search history.

(56) References Cited

U.S. PATENT DOCUMENTS

| 8,289,891 | B2 | 10/2012 | Ji et al. | |
| 8,737,987 | B1* | 5/2014 | Pulugurta | H04W 48/16 |
| | | | | 455/432.1 |
| 9,681,376 | B2 | 6/2017 | Quan et al. | |
| 9,900,928 | B2 | 2/2018 | Wittberg et al. | |
| 2007/0057767 | A1 | 3/2007 | Sun et al. | |
| 2007/0291673 | A1 | 12/2007 | Demirhan et al. | |
| 2009/0279466 | A1 | 11/2009 | Ji et al. | |
| 2011/0292852 | A1* | 12/2011 | Kone | H04W 52/0261 |
| | | | | 370/311 |
| 2014/0036748 | A1 | 2/2014 | Mukherjee et al. | |
| 2015/0156719 | A1 | 6/2015 | Quan et al. | |
| 2015/0201375 | A1* | 7/2015 | Vannithamby | H04W 12/06 |
| | | | | 370/311 |

(Continued)

FOREIGN PATENT DOCUMENTS

| CN | 102084697 A | 6/2011 |
| CN | 104584464 A | 4/2015 |

(Continued)

OTHER PUBLICATIONS

International Search Report in International Application No. PCT/CN2018/089254, dated Feb. 3, 2019.

(Continued)

*Primary Examiner* — Gbemileke J Onamuti
(74) *Attorney, Agent, or Firm* — Finnegan, Henderson, Farabow, Garrett & Dunner, L.L.P.

(57) ABSTRACT

A method for adjusting a discontinuous reception (DRX) related parameter, applied to user equipment (UE), includes: sending a low power saving request message to a base station when obtaining a power saving trigger; receiving a low power saving response message fed back by the base station; and adjusting the DRX related parameter in accordance with the low power saving response message.

16 Claims, 17 Drawing Sheets

(56) References Cited

U.S. PATENT DOCUMENTS

2016/0057806 A1 2/2016 Wittberg et al.
2017/0187474 A1* 6/2017 Bin Sediq ............. H04L 1/1864
2019/0274184 A1 9/2019 Yue et al.

FOREIGN PATENT DOCUMENTS

| CN | 103959864 B | 9/2016 |
| CN | 106851790 A | 6/2017 |
| EP | 2880951 A1 | 6/2015 |
| EP | 3537773 A1 | 9/2019 |
| WO | WO 2007/021115 A1 | 2/2007 |
| WO | WO 2007/149732 A1 | 12/2007 |
| WO | WO 2014/163573 A1 | 10/2014 |
| WO | WO 2018/082542 A1 | 5/2018 |

OTHER PUBLICATIONS

First Office Action of Chinese Application No. 201880000721.9, dated Mar. 26, 2020.
Third Office Action of Chinese Application No. 201880000721.9, dated Apr. 1, 2021.
English version of Written Opinion of the International Search Authority in International Application No. PCT/CN2018/089254, dated Feb. 3, 2019.
Extended European Search Report dated Dec. 15, 2021, from the European Patent Office issued in European Application No. 18921247.5.

* cited by examiner

METHOD AND DEVICE FOR ADJUSTING DRX-RELATED PARAMETER

CROSS-REFERENCE TO RELATED APPLICATIONS

The present application is a continuation of International Application No. PCT/CN2018/089254 filed on May 31, 2018, the disclosure of which is hereby incorporated by reference in its entirety.

TECHNICAL FIELD

The present disclosure generally relates to the technical field of communication, and particularly, to a method and device for adjusting a discontinuous reception (DRX) related parameter.

BACKGROUND

In related art, a mobile terminal may provide rich Application (APP) service for a user. The user may install dozens of and even hundreds of APPs in the mobile terminal. Servers of these APPs may often send various notification messages to the mobile terminal. The mobile terminal monitors a downlink channel at a fixed frequency to receive these notification messages.

SUMMARY

According to a first aspect of embodiments of the present disclosure, a method for adjusting a discontinuous reception (DRX) related parameter, applied to user equipment (UE), includes: sending a low battery saving request to a base station when obtaining a power saving trigger; receiving a low battery saving response fed back by the base station; and adjusting the DRX related parameter according to the low battery saving response.

According to a second aspect of embodiments of the present disclosure, a method for adjusting a DRX related parameter, applied to a base station, includes: receiving a low battery saving request sent by user equipment (UE); and feeding back a low battery saving response to the UE to instruct the UE to adjust the DRX related parameter.

According to a third aspect of embodiments of the present disclosure, UE includes: a processor; and a memory configured to store instructions executable by the processor, wherein the processor is configured to send a low battery saving request to a base station when a power saving trigger is obtained, receive a low battery saving response fed back by the base station; and adjust a DRX related parameter according to the low battery saving response.

It is to be understood that the above general description and detailed description below are only exemplary and explanatory and not intended to limit the present disclosure.

BRIEF DESCRIPTION OF THE DRAWINGS

The accompanying drawings are incorporated in and constitute a part of the specification, illustrate embodiments consistent with the disclosure, and explain the principles of the disclosure together with the specification.

DETAILED DESCRIPTION

Exemplary embodiments will be described in detail below, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Rather, they are merely examples of apparatuses and methods consistent with some aspects of the disclosure as detailed in the appended claims.

In the related art, dozens of and even hundreds of APPs may be installed in user equipment (UE) such as a mobile phone. Servers of the APPs may often send various notification messages to the UE. Therefore, the UE is required to frequently monitor and detect a downlink channel to timely acquire the notification messages. This process causes relatively high power consumption of the UE. Low-battery UE may be turned off in less time due to low battery. In such case, if a user may not charge the UE in a short time, normal use of the user may be influenced.

In view of the above, embodiments of the present disclosure provide a power saving trigger. When the power saving trigger is obtained, the UE negotiates with a base station to adjust a discontinuous reception (DRX) related parameter to prolong a DRX cycle and reduce a frequency or times of downlink channel detections of the UE, thereby reducing the power consumption of the UE and prolonging standby time of the UE.

Figure 1:
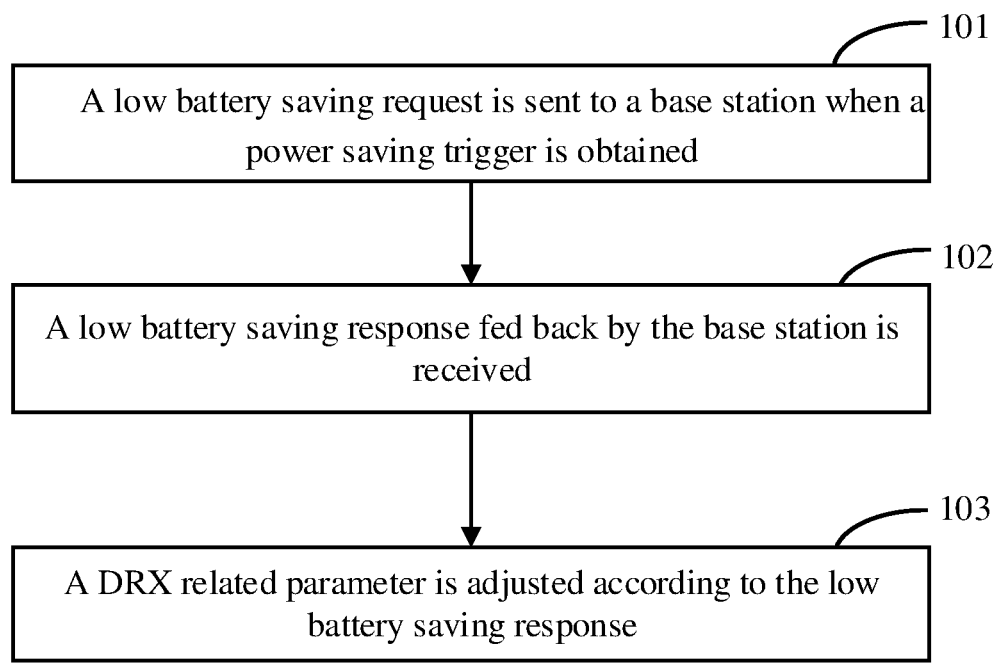
FIG. 1 is a flow chart of a method for adjusting a DRX related parameter, according to an exemplary embodiment.

FIG. 1 is a flow chart of a method for adjusting a DRX related parameter, according to an exemplary embodiment. The method for adjusting a DRX related parameter is applied to UE. The UE may be a mobile phone, a computer, a digital broadcast terminal, a messaging device, a gaming console, a tablet, a medical device, exercise equipment, a personal digital assistant and the like. As shown in FIG. 1, the method includes the following operations.

In operation 101, a low battery saving request is sent to a base station when a power saving trigger is obtained.

In operation 102, a low battery saving response fed back by the base station is received.

In operation 103, the DRX related parameter is adjusted according to the low battery saving response.

In an embodiment, the UE may adopt a DRX mechanism in both an idle state and a connected state, for example, a downlink channel is monitored for a period of time, then monitoring is stopped for a period of time and the two periods of time form a DRX cycle. In the embodiment, adjustment of the DRX related parameter is provided, and an adjustment mechanism for the DRX related parameter is implemented. The DRX related parameter may be increased or decreased according to a practical requirement.

In an embodiment, the DRX related parameter is adjusted to prolong the DRX cycle. For example, the DRX cycle may be prolonged to reduce a frequency, time length or detection times for downlink channel monitoring of the UE, thereby reducing the power consumption of the UE when a user wants to save power of the UE and prolong the standby time. According to the embodiment, a baseband-level power saving solution is implemented.

In an embodiment, obtaining the power saving trigger may include obtaining the power saving trigger based on a manual operation of the user. For example, the UE provides a toggle button for a power saving mode. The user manually clicks the toggle button to make the UE enter the power saving mode. Clicking the toggle button or entering the power saving mode means that the power saving trigger is obtained. Beside the baseband power saving solution, the power saving mode includes another power saving processing solution (for example, entering an airplane mode). As another example, the UE provides a baseband power saving mode, by providing a selection button for entering the baseband power saving mode. Clicking the selection button by the user means that the power saving trigger is obtained. The baseband power saving mode may only include the baseband power saving solution. That is, the power saving mode includes the baseband power saving mode and another power saving mode. The UE provides selection buttons for multiple power saving modes for the user to select.

In an embodiment, obtaining the power saving trigger may include obtaining the power saving trigger based on automatic processing of the UE. For example, when power of the UE is lower than a preset power threshold, the power saving trigger is automatically obtained. The UE monitors present power, and when finding that the present power is lower than the preset power threshold, automatically triggers power saving. As another example, the UE monitors a change of the present power, and when finding that the change of the present power is greater than a preset change threshold, automatically triggers power saving.

In an embodiment, the low battery saving request may be a Radio Resource Control (RRC) request. The low battery saving request may be represented by adding a flag bit to the RRC request or adding a value to a flag bit. Accordingly, the low battery saving response may be an RRC response. The low battery saving response may be represented by adding a flag bit to the RRC response or adding a value to a flag bit.

In an embodiment, the low battery saving request includes an adjusted DRX related parameter; and/or the low battery saving response includes the adjusted DRX related parameter. For example, the UE may report a suggested modified DRX related parameter to the base station for the base station to select. If the base station approves the adjusted DRX related parameter, the low battery saving response fed back by the base station may not include the adjusted DRX related parameter, namely the base station expresses an approval of what the UE reports.

No matter whether the low battery saving request includes the adjusted DRX related parameter, the low battery saving response fed back by the base station may include the adjusted DRX related parameter. The UE performs adjustment according to the adjusted DRX related parameter fed back by the base station.

In an embodiment, the DRX related parameter includes at least one of a threshold of a UE-on counter, a frequency of the UE-on counter or a DRX cycle parameter. The DRX cycle parameter may include at least one of a DRX cycle parameter in an idle state, a long DRX cycle parameter in a connected state, or a short DRX cycle parameter in the connected state.

In an embodiment, when the UE enters a UE-on state, a DRX mechanism is turned on, and when the UE enters a UE-off state, the DRX mechanism is turned off. The UE-on counter is a counter for the DRX mechanism. After the DRX mechanism is turned on, the UE-on counter starts counting, and when the counter expires, the UE enters a sleep state. Therefore, both reducing the threshold of the UE-on counter and reducing the frequency of the UE-on counter may make the UE enter the sleep state more quickly. That is to say, a time length during which monitoring is stopped in the DRX cycle is prolonged and the power can be saved.

In an embodiment, the DRX cycle parameter includes at least one of a DRX cycle parameter in an idle state, a long DRX cycle parameter in a connected state, or a short DRX cycle parameter in the connected state. The DRX cycle may be prolonged by increasing the DRX cycle parameter.

In an embodiment, the DRX cycle may be prolonged by milliseconds, at most not more than a second. After the DRX cycle is prolonged, the UE may receive a notification message with a delay of several milliseconds but may not lose the notification message. The delay of several milliseconds is almost insignificant for the user, and the power can be saved effectively.

In an embodiment, the base station may determine the parameter contained in the low battery saving response according to a present state of the UE. For example, when the UE is in the idle state, the low battery saving response includes the DRX cycle parameter in the idle state. As another example, when the UE presently turns on a long DRX mechanism in the connected state, the low battery saving response includes the long DRX cycle parameter in the connected state.

In an embodiment, the base station sends all DRX cycle parameters in multiple states to the UE. For example, the low battery saving response includes the DRX cycle parameter in the idle state, the long DRX cycle parameter in the connected state and the short DRX cycle parameter in the connected state. The UE selects the respective DRX cycle parameter according to its present state. For example, if the UE presently turns on the long DRX mechanism in the connected state, the long DRX cycle parameter in the connected state is adjusted according to the low battery saving response. When the UE is switched to the idle state, the DRX cycle parameter in the idle state is adjusted according to the low battery saving response.

In an embodiment, before the low battery saving request is sent to the base station, the method further includes: when the power saving trigger is obtained, determining whether the number of times that the low battery saving request has been sent reaches a count threshold. Accordingly, operation 101 further includes: when the number of the times that the low battery saving request has been sent does not reach the count threshold, the low battery saving request is sent to the base station.

According to the embodiment, the power saving trigger may be obtained for multiple times, and the low battery saving request may be sent for multiple times. For example, the power saving mode includes multiple levels, for example, a first level, a second level and a third level, and if the level is higher, a power saving degree is higher. The UE selects a power saving mode of the first level, which is equivalent to obtaining the power saving trigger once, then the DRX related parameter is adjusted once to prolong the DRX cycle. The user may also increase the power saving degree and select a power saving mode of the second level, which is equivalent to obtaining the power saving trigger again, then the DRX related parameter is adjusted again based on the parameter adjusted last time to further prolong the DRX cycle. As another example, the present power is less than 20% (a first power threshold), which is equivalent to the power saving trigger is obtained once, then the DRX related parameter is adjusted once to prolong the DRX cycle. Then, the present power is less than 10% (a second power threshold), which is equivalent to obtaining the power saving trigger again, then the DRX related parameter is adjusted again based on the parameter adjusted last time to further prolong the DRX cycle.

According to the embodiment, the low battery saving request may be sent for multiple times, namely the DRX related parameter may be adjusted for multiple times. However, the number of the times that the low battery saving request has been sent may not be excessive, e.g., greater than a predetermined number. For example, the count threshold is about 2. On the one hand, since an adjustable range of the DRX related parameter is limited, adjustment times should not be excessive. On the other hand, excessively sending the low battery saving request may occupy more network signaling resources.

In an embodiment, starting from a normal value of the DRX related parameter, the number of times is updated every time when the low battery saving request is sent.

In an embodiment, the method further includes: when a recovery trigger is obtained, a power recovery request is sent to the base station; a power recovery response fed back by the base station is received; and the DRX related parameter is adjusted to a normal value according to the power recovery response.

In the embodiment, the user may manually exit from the power saving mode, by obtaining the recovery trigger. When being triggered by the recovery trigger, the UE negotiates with the base station to adjust the DRX related parameter back to the normal value. The UE may pre-store the normal value and thus is only required to execute an adjustment process. Alternatively, the power recovery response contains the normal value, and the UE adjusts the DRX related parameter back to the normal value according to the feedback of the base station.

The UE may also obtain the recovery trigger in an automatic detection manner. For example, the UE detects that the present power is more than 20% (the first power threshold) or 25% (a third power threshold) to obtain the recovery trigger.

In an embodiment, both the power recovery request and the power recovery response are RRC messages.

In an embodiment, after the DRX related parameter is adjusted to the normal value, the recorded sending times of the low battery saving request may be cleared. After the DRX related parameter is adjusted back to the normal value, the UE may timely receive various notification messages.

In an embodiment, after the low battery saving request is sent to the base station, the method further includes: a low battery saving rejection message fed back by the base station is received; and adjustment of the DRX related parameter is aborted according to the low battery saving rejection message.

In the embodiment, the low battery saving rejection message is an RRC message. A DRX related parameter adjustment rejection mechanism is provided, so that the adjustment mechanism is more complete. The base station may determine to approve or reject adjustment of the DRX related parameter by the UE according to a network communication environment, a present service of the UE and the like.

In an embodiment, before the low battery saving request is sent to the base station, the method further includes: determining whether a timer expires, the timer starting timing from a last time when the low battery saving request is sent or a time when the low battery saving rejection message is received. Accordingly, operation 101 further includes: when the timer expires, the low battery saving request is sent to the base station.

According to the embodiment, the low battery saving request may be sent for multiple times, but a certain time interval may exist between every two low battery saving requests, to reduce influence on the network communication environment. In addition, the UE, after receiving the low battery saving rejection message, may send the low battery saving request again after a certain time interval. The base station may reject the low battery saving request of the UE due to a present network environment, so the present network environment may not be suitable for sending the low battery saving request. Network congestion and occupied network resources may be reduced.

The above embodiments may be combined with each other. For example, the low battery saving request may be sent again when the count threshold is met and the timer expires.

Figure 2:
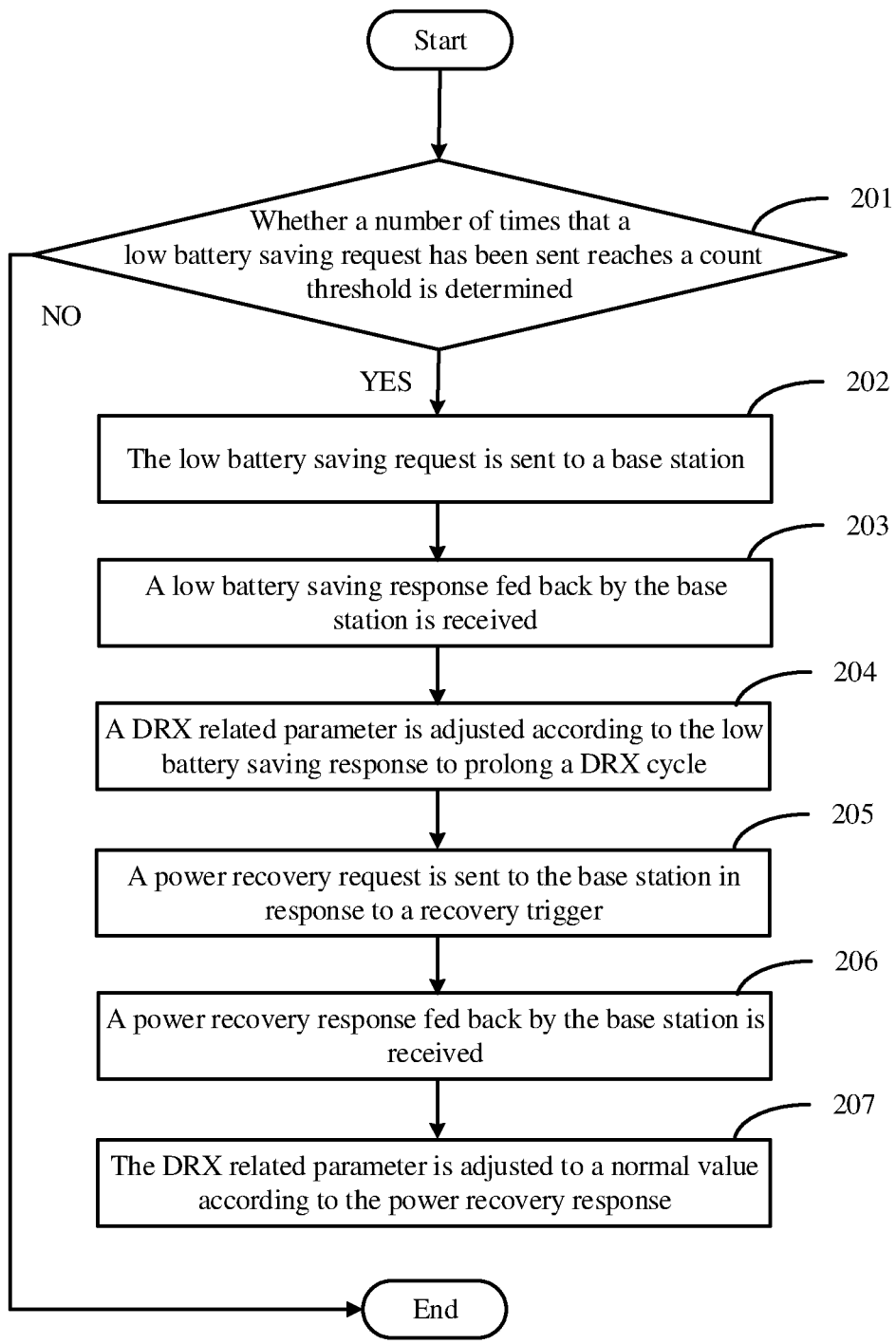
FIG. 2 is a flow chart of a method for adjusting a DRX related parameter, according to an exemplary embodiment.

FIG. 2 is a flow chart of a method for adjusting a DRX related parameter, according to an exemplary embodiment. The method for adjusting a DRX related parameter is applied to UE. The UE may be a mobile phone, a computer, a digital broadcast terminal, a messaging device, a gaming console, a tablet, a medical device, exercise equipment, a personal digital assistant and the like. As shown in FIG. 2, the method includes the following operations.

In operation 201, when a power saving trigger is obtained, whether a number of times that a low battery saving request has been sent reaches a count threshold is determined. When the number of the times that the low battery saving request has been sent does not reach the count threshold, operation 202 is continued. When the number of the times that the low battery saving request has been sent reaches the count threshold, the flow is ended.

In operation 202, the low battery saving request is sent to a base station.

In operation 203, a low battery saving response fed back by the base station is received.

In operation 204, the DRX related parameter is adjusted according to the low battery saving response to prolong a DRX cycle.

In operation 205, when a recovery trigger is obtained, a power recovery request is sent to the base station.

In operation 206, a power recovery response fed back by the base station is received.

In operation 207, the DRX related parameter is adjusted to a normal value according to the power recovery response.

Figure 3:
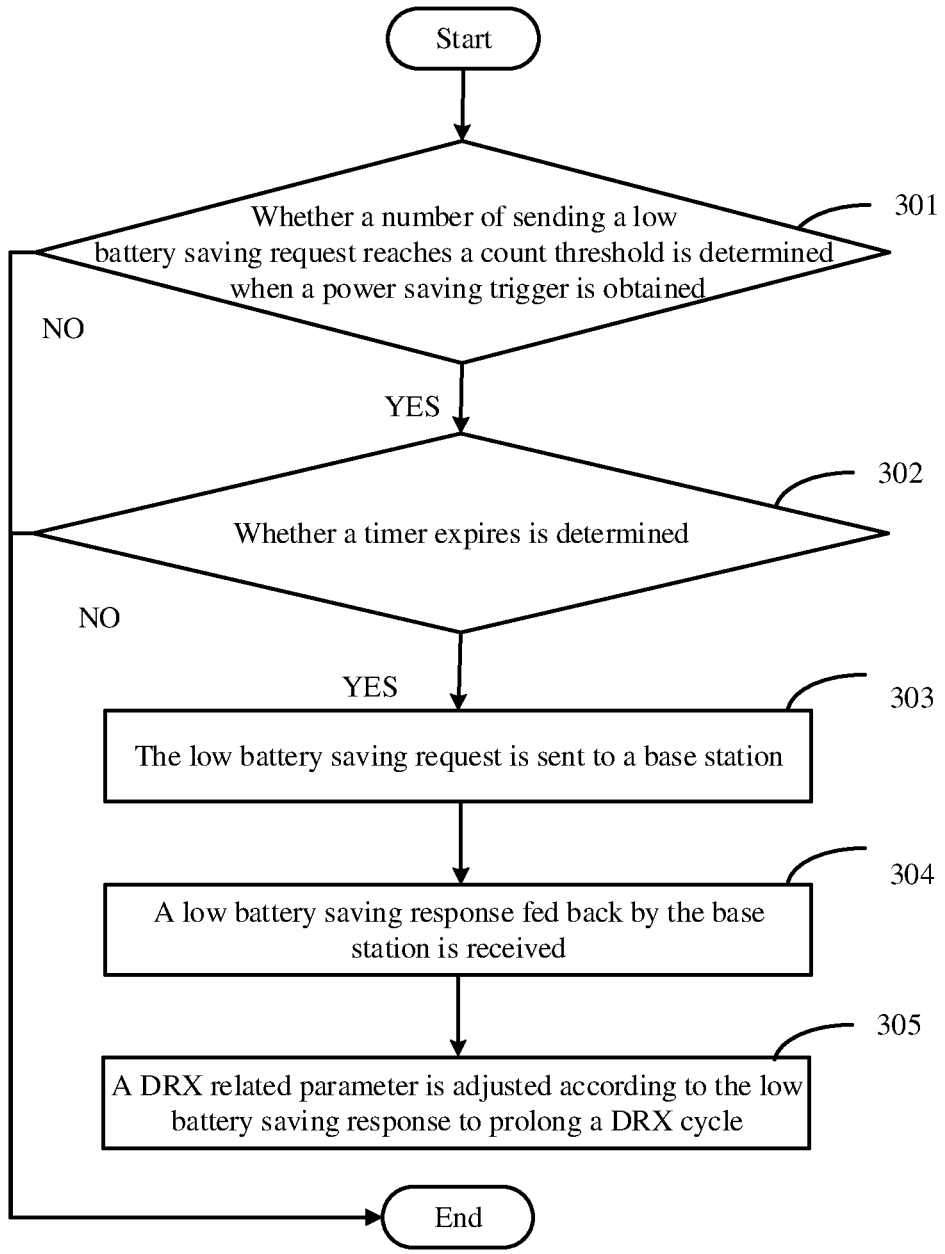
FIG. 3 is a flow chart of a method for adjusting a DRX related parameter, according to an exemplary embodiment.

FIG. 3 is a flow chart of a method for adjusting a DRX related parameter, according to an exemplary embodiment. The method for adjusting a DRX related parameter is applied to UE. The UE may be a mobile phone, a computer, a digital broadcast terminal, a messaging device, a gaming console, a tablet, a medical device, exercise equipment, a personal digital assistant and the like. As shown in FIG. 3, the method includes the following operations.

In operation 301, when a power saving trigger is obtained, whether a number of times that a low battery saving request has been sent reaches a count threshold is determined. When the number of the times that the low battery saving request has been sent does not reach the count threshold, operation 302 is continued. When the number of the times that the low battery saving request has been sent reaches the count threshold, the flow is ended.

In operation 302, whether a timer expires is determined, the timer starts timing from a last time when the low battery saving request is sent or a time when a low battery saving rejection message is received. When the timer expires, operation 303 is continued. When the timer does not expire, the flow is ended.

Operation 301 may be performed before, after, or at the same time with operation 302.

In operation 303, the low battery saving request is sent to a base station.

In operation 304, a low battery saving response fed back by the base station is received.

In operation 305, a DRX related parameter is adjusted according to the low battery saving response to prolong a DRX cycle.

Figure 4:
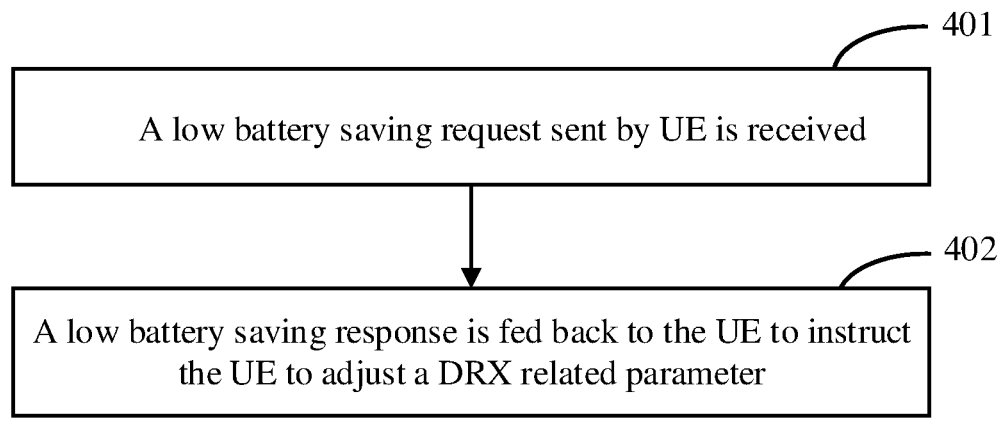
FIG. 4 is a flow chart of a method for adjusting a DRX related parameter, according to an exemplary embodiment.

FIG. 4 is a flow chart of a method for adjusting a DRX related parameter, according to an exemplary embodiment. The method for adjusting a DRX related parameter is applied to a network access device such as a base station. As shown in FIG. 4, the method includes the following operations.

In operation 401, a low battery saving request sent by UE is received.

In operation 402, a low battery saving response is fed back to the UE to instruct the UE to adjust a DRX related parameter.

In an embodiment, the base station may support a DRX related parameter adjustment mechanism. The base station may receive and recognize the low battery saving request, and the low battery saving request may be an RRC message. The low battery saving request is tagged through a specific flag bit in the RRC message or a specific value of a flag bit.

In an embodiment, the base station controls the DRX cycle of the UE, so that a network communication environment may be conveniently controlled.

In an embodiment, the operation that the low battery saving response is fed back to the UE to instruct the UE to adjust the DRX related parameter further includes: the low battery saving response is fed back to the UE to instruct the UE to adjust the DRX related parameter to prolong a DRX cycle.

In an embodiment, the low battery saving request includes an adjusted DRX related parameter; and/or the low battery saving response includes the adjusted DRX related parameter. For example, the low battery saving request may include the adjusted DRX related parameter, and the base station may approve adoption of the adjusted DRX related parameter, so that the low battery saving response may not contain the DRX related parameter, which indicates that the request of the UE is approved. Also for example, no matter whether the low battery saving request includes the adjusted DRX related parameter, the low battery saving response fed back by the base station may include the adjusted DRX related parameter. The DRX related parameter in the low battery saving response may be the same as or different from the DRX related parameter in the low battery saving request. The UE takes the DRX related parameter contained in the low battery saving response.

In an embodiment, the base station may determine the adjusted DRX related parameter according to a pre-configured strategy. For example, the adjusted DRX related parameter is determined according to a present network communication environment, a present service of the UE and the like.

In an embodiment, the DRX related parameter includes at least one of a threshold of a UE-on counter; a frequency of the UE-on counter or a DRX cycle parameter. The DRX cycle parameter includes at least one of a DRX cycle parameter in an idle state, a long DRX cycle parameter in a connected state and a short DRX cycle parameter in the connected state.

In an embodiment, the base station may determine the parameter contained in the low battery saving response according to a present state of the UE. For example, when the UE is in the idle state, the low battery saving response includes the DRX cycle parameter in the idle state. As another example, when the UE presently turns on a long DRX mechanism in the connected state, the low battery saving response includes the long DRX cycle parameter in the connected state.

In an embodiment, the base station sends all DRX cycle parameters in multiple states to the UE. For example, the low battery saving response includes the DRX cycle parameter in the idle state, the long DRX cycle parameter in the connected state and the short DRX cycle parameter in the connected state. The UE selects the respective DRX cycle parameter according to its present state. For example, if the UE presently turns on the long DRX mechanism in the connected state, the long DRX cycle parameter in the connected state is adjusted according to the low battery saving response. When the UE is switched to the idle state, the DRX cycle parameter in the idle state is adjusted according to the low battery saving response.

In an embodiment, after the operation that the low battery saving request sent by the UE is received, the method further includes: a low battery saving rejection message is fed back to the UE to stop the UE from adjusting the DRX related parameter.

In the embodiment, the base station may reject the request of the UE to stop the UE from adjusting the DRX related parameter. In the embodiment, a complete adjustment mechanism is provided.

In an embodiment, the method further includes: after the low battery saving request sent by the UE is received, whether a number of times that the low battery saving request has been received exceeds a preset count threshold is determined; and the operation that the low battery saving rejection message is fed back to the UE further includes: when the number of times that the low battery saving request has been received exceeds the preset count threshold, the low battery saving rejection message is fed back to the UE. When the number of times that the low battery saving request has been received does not exceed the preset count threshold, operation 402 may be continued.

In an embodiment, the base station may control times of DRX related parameter adjustment of the UE through the count threshold (for example, 2). Accordingly, frequent adjustment of the DRX related parameter may be reduced, frequent sending of the low battery saving request by the UE may be reduced, and occupied network resources may be reduced. The UE, after the low battery saving rejection message is received and before the parameter is recovered to the normal value, may not send the low battery saving request any more or the UE may not send the low battery saving request in a short time.

In an embodiment, the base station, after feeding back the low battery recovery response, may clear the number of times that the low battery saving request has been received.

Figure 5:
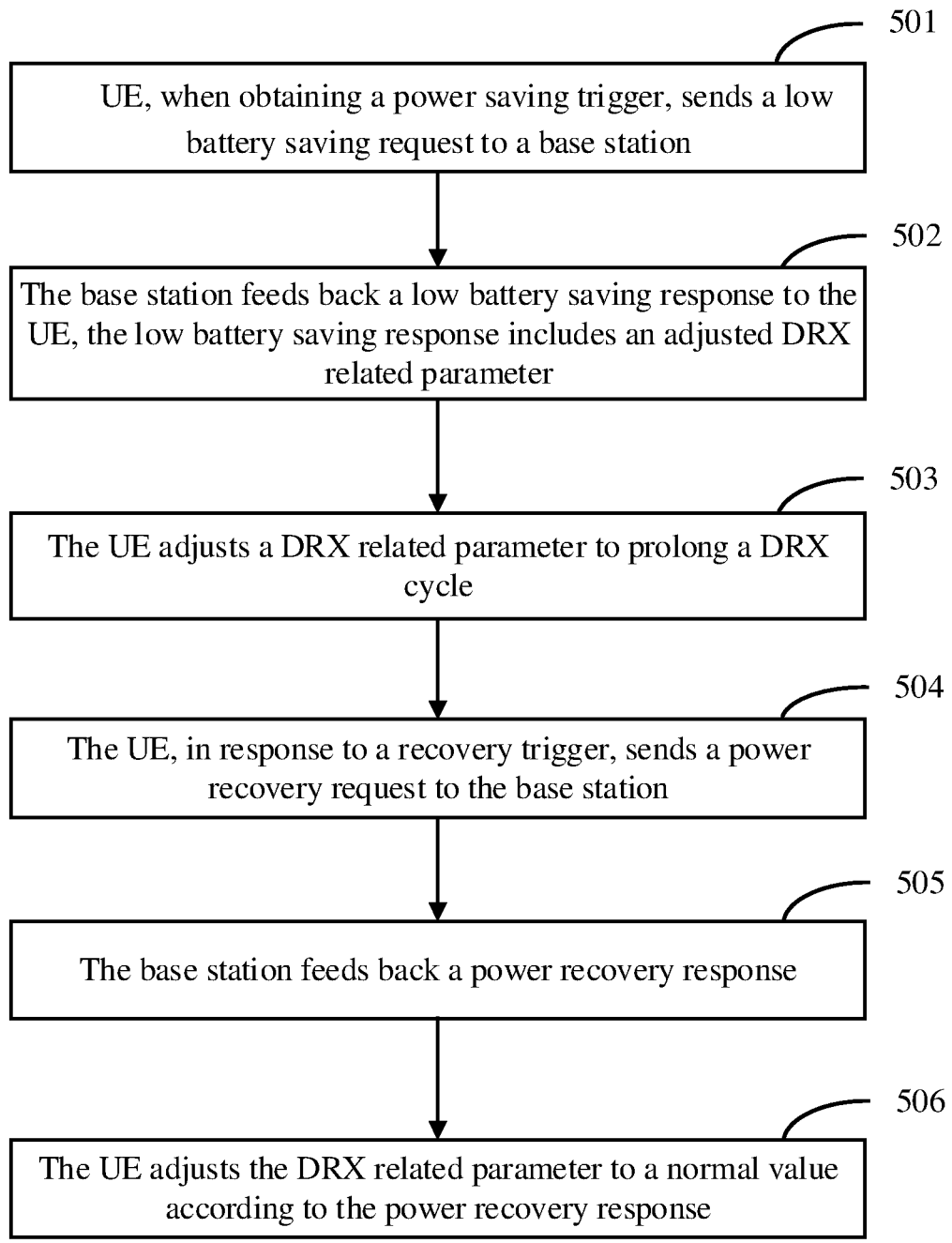
FIG. 5 is a flow chart of a method for adjusting a DRX related parameter, according to an exemplary embodiment.

FIG. 5 is a flow chart of a method for adjusting a DRX related parameter, according to an exemplary embodiment. The method includes the following operations.

In operation 501, UE, when obtaining a power saving trigger, sends a low battery saving request to a base station.

In operation 502, the base station feeds back a low battery saving response to the UE, the low battery saving response including an adjusted DRX related parameter.

In operation 503, the UE adjusts a DRX related parameter to prolong a DRX cycle.

In operation 504, the UE, when obtaining a recovery trigger, sends a power recovery request to the base station.

In operation 505, the base station feeds back a power recovery response.

In operation 506, the UE adjusts the DRX related parameter to a normal value according to the power recovery response.

Figure 6:
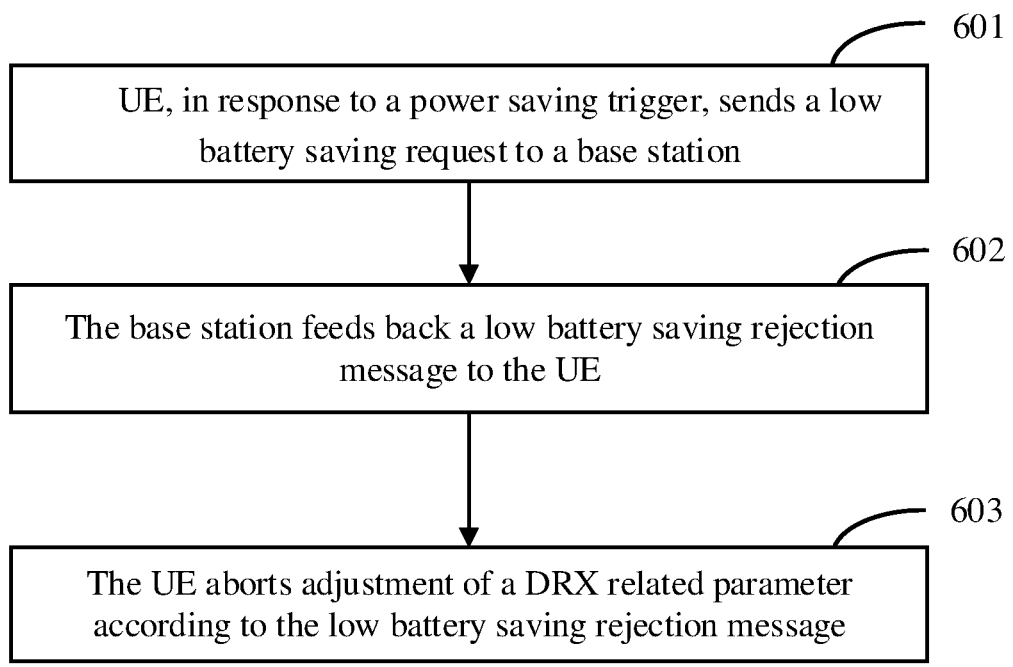
FIG. 6 is a flow chart of a method for adjusting a DRX related parameter, according to an exemplary embodiment.

FIG. 6 is a flow chart of a method for adjusting a DRX related parameter, according to an exemplary embodiment. The method includes the following operations.

In operation 601, UE, when obtaining a power saving trigger, sends a low battery saving request to a base station.

In operation 602, the base station feeds back a low battery saving rejection message to the UE.

In operation 603, the UE aborts adjustment of a DRX related parameter according to the low battery saving rejection message.

The above embodiments may be freely combined according to a practical requirement.

Figure 7:
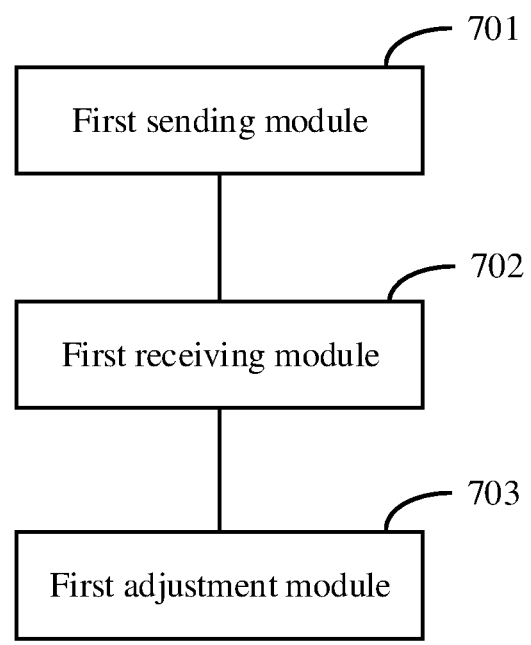
FIG. 7 is a block diagram of a device for adjusting a DRX related parameter, according to an exemplary embodiment.

FIG. 7 is a block diagram of a device for adjusting a DRX related parameter, according to an exemplary embodiment. Each module in the device may be implemented through software, or hardware, or a combination of software and hardware. The device may be UE. Referring to FIG. 7, the device for adjusting a DRX related parameter includes a first sending module 701 configured to, when a power saving trigger is obtained, send a low battery saving request to a base station; a first receiving module 702 configured to receive a low battery saving response fed back by the base station; and a first adjustment module 703 configured to adjust a DRX related parameter according to the low battery saving response.

In an embodiment, the first adjustment module 703 includes: a first adjustment submodule, configured to adjust the DRX related parameter to prolong a DRX cycle.

In an embodiment, the low battery saving request includes an adjusted DRX related parameter; and/or the low battery saving response includes the adjusted DRX related parameter.

In an embodiment, the DRX related parameter includes at least one of a threshold of a UE on counter, a frequency of the UE on counter and a DRX cycle parameter. The DRX cycle parameter includes at least one of a DRX cycle parameter in an idle state, a long DRX cycle parameter in a connected state and a short DRX cycle parameter in the connected state.

Figure 8:
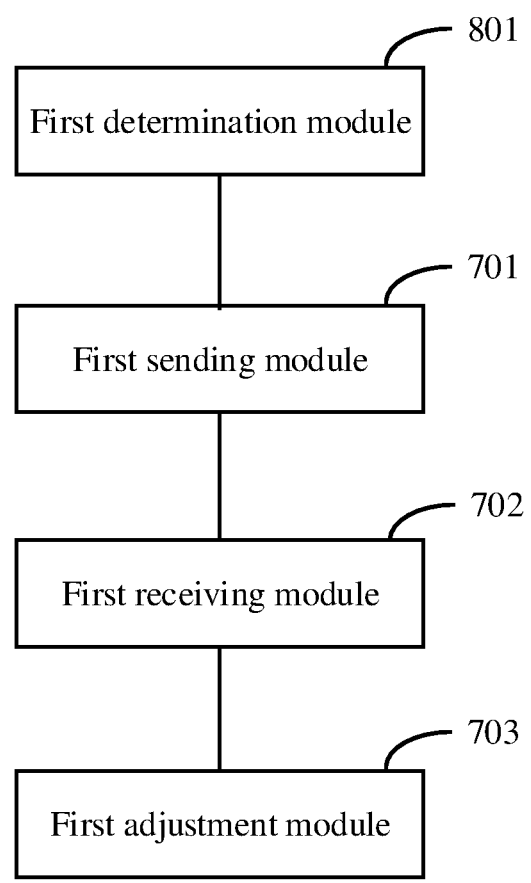
FIG. 8 is a block diagram of a device for adjusting a DRX related parameter, according to an exemplary embodiment.

In an embodiment, as shown in FIG. 8, the device further includes: a first determination module 801, configured to determine whether a number of times that the low battery saving request has been sent reaches a count threshold when the power saving trigger is obtained.

Figure 9:
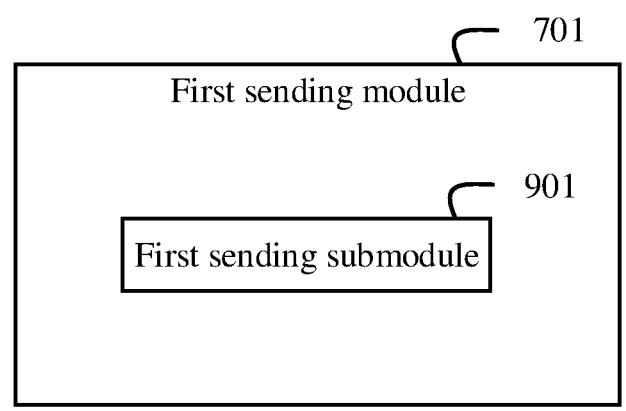
FIG. 9 is a block diagram of a first sending module, according to an exemplary embodiment.

In an embodiment, as shown in FIG. 9, the first sending module 701 includes a first sending submodule 901 configured to send the low battery saving request to the base station when the number of the times that the low battery saving request has been sent does not reach the count threshold.

Figure 10:
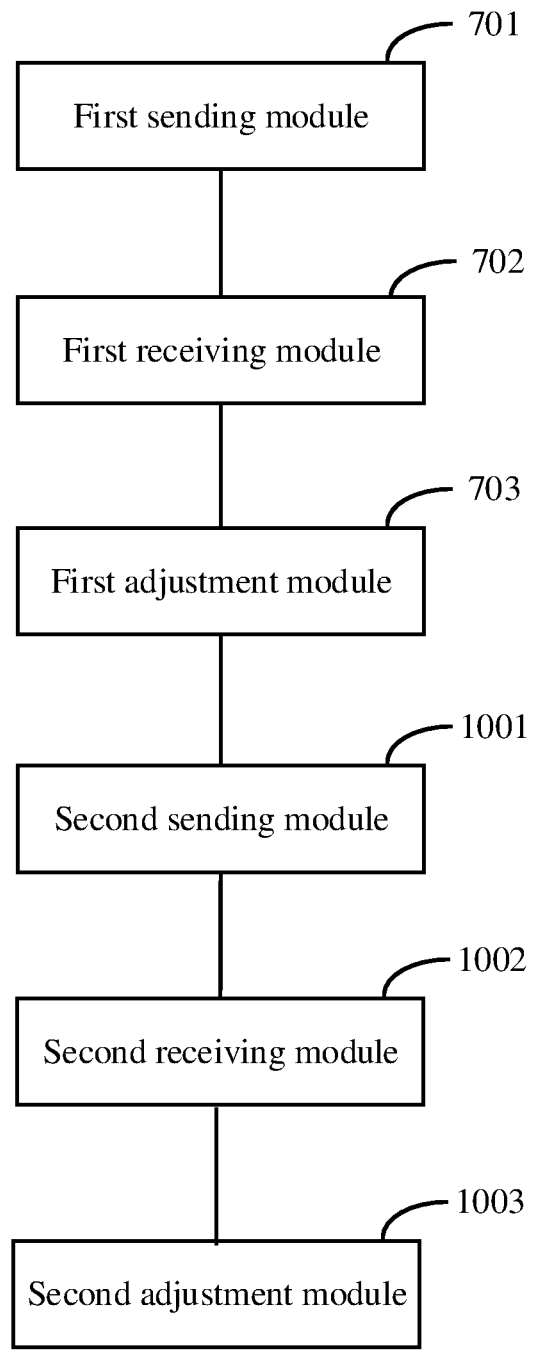
FIG. 10 is a block diagram of a device for adjusting a DRX related parameter, according to an exemplary embodiment.

In an embodiment, as shown in FIG. 10, the device further includes a second sending module 1001 configured to send a power recover request to the base station when a recovery trigger is obtained; a second receiving module 1002 configured to receive a power recovery response fed back by the base station; and a second adjustment module 1003 configured to adjust the DRX related parameter to a normal value according to the power recovery response.

Figure 11:
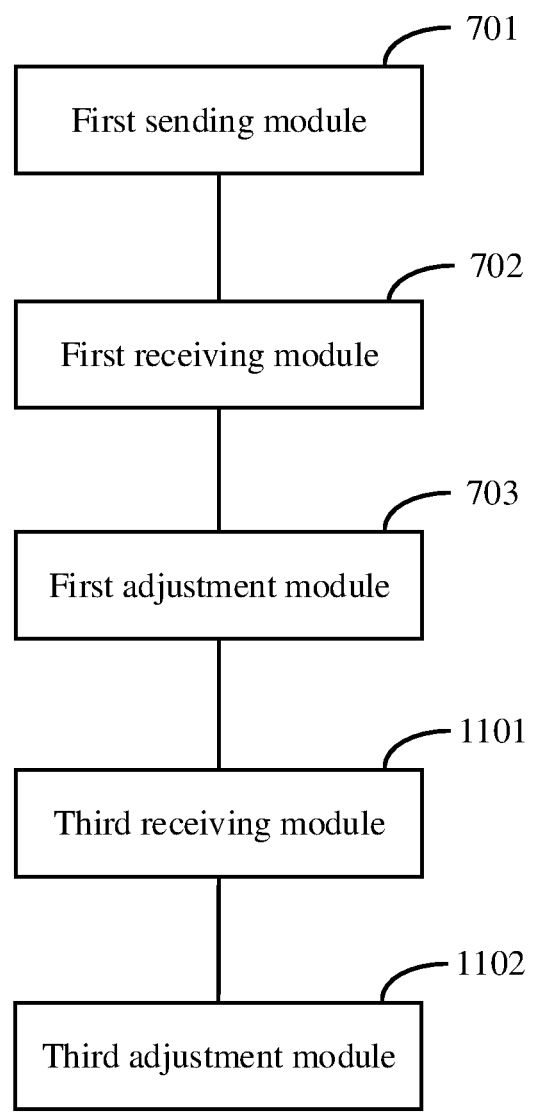
FIG. 11 is a block diagram of a device for adjusting a DRX related parameter, according to an exemplary embodiment.

In an embodiment, as shown in FIG. 11, the device further includes a third receiving module 1101 configured to receive a low battery saving rejection message fed back by the base station; and a third adjustment module 1102 configured to abort adjustment of the DRX related parameter according to the low battery saving rejection message.

Figure 12:
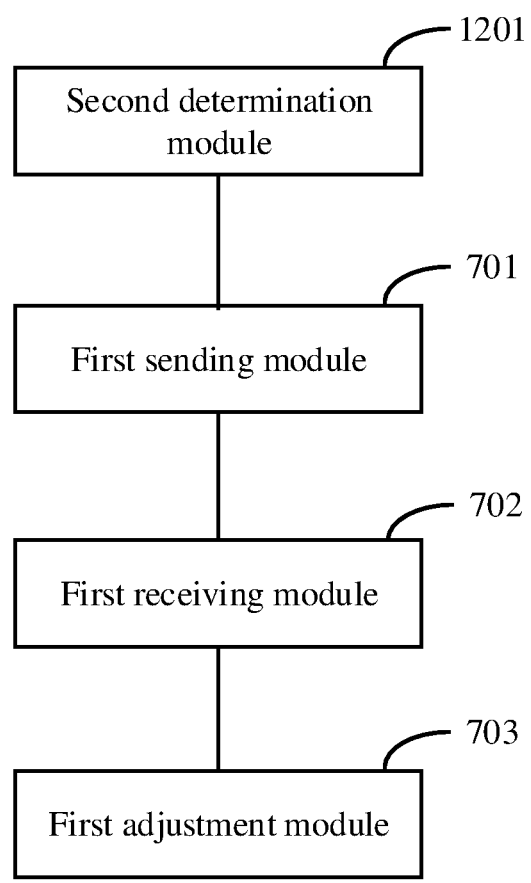
FIG. 12 is a block diagram of a device for adjusting a DRX related parameter, according to an exemplary embodiment.

In an embodiment, as shown in FIG. 12, the device further includes a second determination module 1201 configured to determine whether a timer expires, the timer starting timing from a last time when the low battery saving request is sent or a time when the low battery saving rejection message is received.

Figure 13:
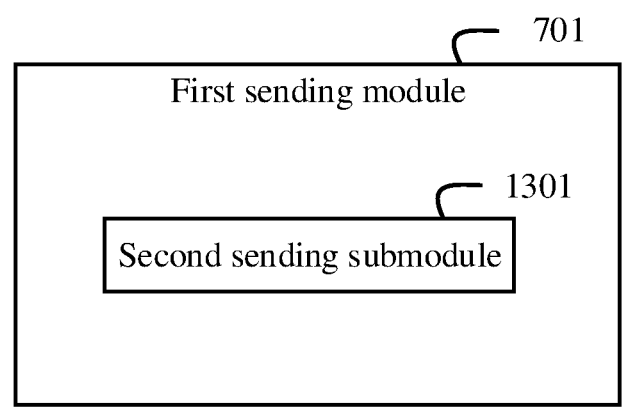
FIG. 13 is a block diagram of a first sending module, according to an exemplary embodiment.

In an embodiment, as shown in FIG. 13, the first sending module 701 includes a second sending submodule 1301 configured to send the low battery saving request to the base station when the timer expires.

Figure 14:
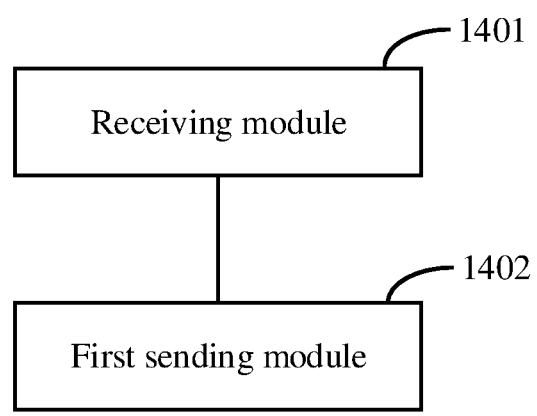
FIG. 14 is a block diagram of a device for adjusting a DRX related parameter, according to an exemplary embodiment.

FIG. 14 is a block diagram of a device for adjusting a DRX related parameter, according to an exemplary embodiment. Each module in the device may be implemented through software, or hardware, or a combination of software and hardware. The device may be a base station. Referring to FIG. 14, the device for adjusting a DRX related parameter includes a receiving module 1401 configured to receive a low battery saving request sent by UE; and a first sending module 1402 configured to feed back a low battery saving response to the UE to instruct the UE to adjust a DRX related parameter.

In an embodiment, the first sending module 1402 includes: a first sending submodule, configured to feed back the low battery saving response to the UE to instruct the UE to adjust the DRX related parameter to prolong a DRX cycle.

In an embodiment, the low battery saving request includes an adjusted DRX related parameter; and/or the low battery saving response includes the adjusted DRX related parameter.

In an embodiment, the DRX related parameter includes at least one of a threshold of a UE on counter, a frequency of the UE on counter and a DRX cycle parameter. The DRX cycle parameter includes at least one of a DRX cycle parameter in an idle state, a long DRX cycle parameter in a connected state and a short DRX cycle parameter in the connected state.

Figure 15:
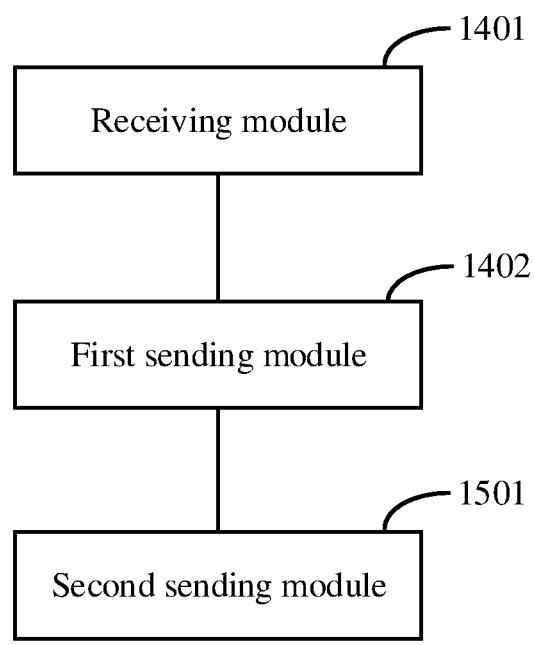
FIG. 15 is a block diagram of a device for adjusting a DRX related parameter, according to an exemplary embodiment.

In an embodiment, as shown in FIG. 15, the device further includes a second sending module 1501 configured to feed back a low battery saving rejection message to the UE to stop the UE from adjusting the DRX related parameter.

In an embodiment, the device further includes: a determination module, configured to, after the low battery saving request sent by the UE is received, determine whether a number of times that the low battery saving request has been received exceeds a preset count threshold. Accordingly, the second sending module 1501 includes: a second sending submodule, configured to, when the number of times that the low battery saving request has been received exceeds the preset count threshold, feed back the low battery saving rejection message to the UE.

With respect to the device in the above embodiments, specific manners for performing operations by individual modules therein have been described in detail in the embodiments regarding the method, which will not be repeated herein.

Figure 16:
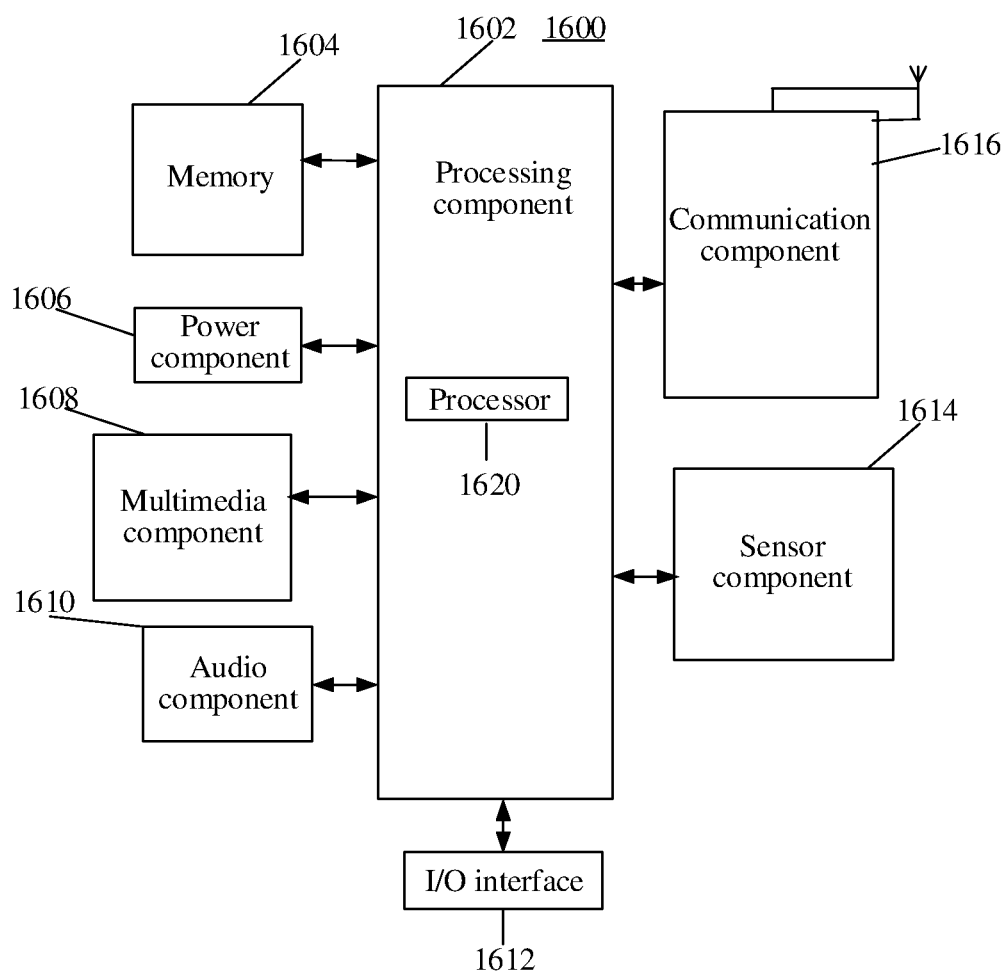
FIG. 16 is a block diagram of a device for adjusting a DRX related parameter, according to an exemplary embodiment.

FIG. 16 is a block diagram of a device 1600 for adjusting a DRX related parameter, according to an exemplary embodiment. For example, the device 1600 may be a mobile phone, a computer, a digital broadcast terminal, a messaging device, a gaming console, a tablet, a medical device, exercise equipment, a personal digital assistant and the like.

The device 1600 may include one or more of the following components: a processing component 1602, a memory 1604, a power component 1606, a multimedia component 1608, an audio component 1610, an Input/Output (I/O) interface 1612, a sensor component 1614, and a communication component 1616.

The processing component 1602 typically controls overall operations of the device 1600, such as the operations associated with display, telephone calls, data communications, camera operations, and recording operations. The processing component 1602 may include one or more processors 1620 to execute instructions to perform all or part of the operations in the abovementioned method. Moreover, the processing component 1602 may include one or more modules which facilitate interaction between the processing component 1602 and the other components. For instance, the processing component 1602 may include a multimedia module to facilitate interaction between the multimedia component 1608 and the processing component 1602.

The memory 1604 is configured to store various types of data to support the operation of the device 1600. Examples of such data include instructions for any APPs or methods operated on the device 1600, contact data, phonebook data, messages, pictures, video, etc. The memory 1604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1606 provides power for various components of the device 1600. The power component 1606 may include a power management system, one or more power supplies, and other components associated with generation, management and distribution of power for the device 1600.

The multimedia component 1608 includes a screen providing an output interface between the device 1600 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1608 includes a front camera and/or a rear camera. The front camera and/or the rear camera may receive external multimedia data when the device 1600 is in an operation mode, such as a photographing mode or a video mode. Each of the front camera and the rear camera may be a fixed optical lens system or have focusing and optical zooming capabilities.

The audio component 1610 is configured to output and/or input an audio signal. For example, the audio component 1610 includes a Microphone (MIC), and the MIC is configured to receive an external audio signal when the device 1600 is in the operation mode, such as a call mode, a recording mode and a voice recognition mode. The received audio signal may further be stored in the memory 1604 or sent through the communication component 1616. In some embodiments, the audio component 1610 further includes a speaker configured to output the audio signal.

The I/O interface 1612 provides an interface between the processing component 1602 and a peripheral interface module, and the peripheral interface module may be a keyboard, a click wheel, a button and the like. The button may include, but not limited to: a home button, a volume button, a starting button and a locking button.

The sensor component 1614 includes one or more sensors configured to provide status assessment in various aspects for the device 1600. For instance, the sensor component 1614 may detect an on/off status of the device 1600 and relative positioning of components, such as a display and small keyboard of the device 1600, and the sensor component 1614 may further detect a change in a position of the device 1600 or a component of the device 1600, presence or absence of contact between the user and the device 1600, orientation or acceleration/deceleration of the device 1600 and a change in temperature of the device 1600. The sensor component 1614 may include a proximity sensor configured to detect presence of an object nearby without any physical contact. The sensor component 1614 may also include a light sensor, such as a Complementary Metal Oxide Semiconductor (CMOS) or Charge Coupled Device (CCD) image sensor, configured for use in an imaging APP. In some embodiments, the sensor component 1614 may also include an acceleration sensor, a gyroscope sensor, a magnetic sensor, a pressure sensor or a temperature sensor.

The communication component 1616 is configured to facilitate wired or wireless communication between the device 1600 and another device. The device 1600 may access a communication-standard-based wireless network, such as a Wireless Fidelity (WiFi) network, a 4th-Generation (4G) or 5th-Generation (5G) network or a combination thereof. In an exemplary embodiment, the communication component 1616 receives a broadcast signal or broadcast associated information from an external broadcast management system through a broadcast channel In an exemplary embodiment, the communication component 1616 further includes a Near Field Communication (NFC) module to facilitate short-range communication. In an exemplary embodiment, the communication component 1616 may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, the processor 1620 is configured to: when a power saving trigger is obtained, send a low battery saving request to a base station; receive a low battery saving response fed back by the base station; and adjust the DRX related parameter according to the low battery saving response.

In an exemplary embodiment, the low battery saving request includes an adjusted DRX related parameter; and/or the low battery saving response includes the adjusted DRX related parameter.

In an exemplary embodiment, the DRX related parameter is adjusted to prolong a DRX cycle.

In an exemplary embodiment, the DRX related parameter includes at least one of a threshold of a UE-on counter, a frequency of the UE-on counter and a DRX cycle parameter, and the DRX cycle parameter includes at least one of a DRX cycle parameter in an idle state, a long DRX cycle parameter in a connected state and a short DRX cycle parameter in the connected state.

In an exemplary embodiment, the processor 1620 is further configured to: when the power saving trigger is obtained before the low battery saving request is sent to the base station, determine whether a number of times that the low battery saving request has been sent reaches a count threshold; and when the number of the times that the low battery saving request has been sent does not reach the count threshold, send the low battery saving request to the base station.

In an exemplary embodiment, when a recovery trigger is obtained, a power recovery request is sent to the base station; a power recovery response fed back by the base station is received; and the DRX related parameter is adjusted to a normal value according to the power recovery response.

In an exemplary embodiment, after the low battery saving request is sent to the base station, the processor 1620 is further configured to: receive a low battery saving rejection message fed back by the base station; and abort adjustment of the DRX related parameter according to the low battery saving rejection message.

In an exemplary embodiment, the processor 1620 is further configured to: determine whether a timer expires before the low battery saving request is sent to the base station, the timer starting timing from a last time when the low battery saving request is sent or a time when the low battery saving rejection message is received; and when the timer expires, send the low battery saving request to the base station.

In an exemplary embodiment, there is also provided a non-transitory computer-readable storage medium including instructions, such as the memory 1604 including instructions, and the instructions may be executed by the processor 1620 of the device 1600 to perform the above described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 17:
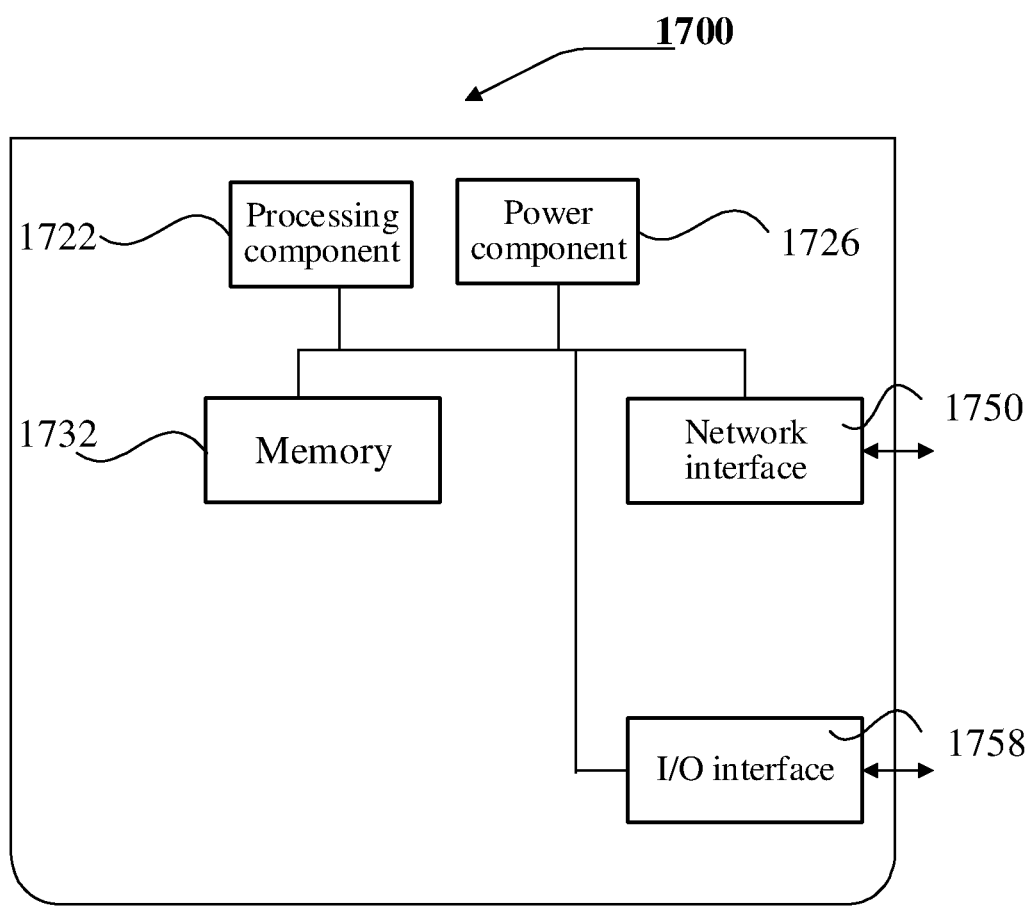
FIG. 17 is a block diagram of a device for adjusting a DRX related parameter, according to an exemplary embodiment.

FIG. 17 is a block diagram of a device 1700 for adjusting a DRX related parameter, according to an exemplary embodiment. For example, the device 1700 may be provided as a base station. Referring to FIG. 17, the device 1700 includes a processing component 1722, which may further include one or more processors, and a memory resource represented by a memory 1732, configured to store an instruction executable by the processing component 1722, for example, an application (APP). The APP stored in the memory 1732 may include one or more modules each of which corresponds to a set of instructions. The processing component 1722 is configured to execute instructions to perform the method for adjusting a DRX related parameter.

The device 1700 may further include a power component 1726 configured to execute power management of the device 1700, a wired or wireless network interface 1750 configured to connect the device 1700 to a network and an I/O interface 1758. The device 1700 may be operated based on an operating system stored in the memory 1732, for example, Windows Server™, Mac OS X™, Unix™, Linux™, FreeBSD™ or the like.

In an exemplary embodiment, the processor in the processing component 1722 is configured to: receive a low battery saving request sent by UE; and feed back a low battery saving response to the UE to instruct the UE to adjust a DRX related parameter.

In an embodiment, the low battery saving response is fed back to the UE to instruct the UE to adjust the DRX related parameter to prolong a DRX cycle.

In an embodiment, the low battery saving request includes an adjusted DRX related parameter; and/or the low battery saving response includes the adjusted DRX related parameter.

In an embodiment, the DRX related parameter includes at least one of a threshold of a UE-on counter, a frequency of the UE-on counter and a DRX cycle parameter, and the DRX cycle parameter includes at least one of a DRX cycle parameter in an idle state, a long DRX cycle parameter in a connected state and a short DRX cycle parameter in the connected state.

In an embodiment, after the low battery saving request sent by the UE is received, the processor in the processing component 1722 is further configured to feed back a low battery saving rejection message to the UE to stop the UE from adjusting the DRX related parameter.

In an embodiment, the processor in the processing component 1722 is further configured to: after the low battery saving request sent by the UE is received, determine whether a number of times that the low battery saving request has been received exceeds a preset count threshold is determined; and when the number of times that the low battery saving request has been received exceeds the preset count threshold, feed back the low battery saving rejection message to the UE.

In an exemplary embodiment, there is also provided a non-transitory computer-readable storage medium including instructions, such as the memory 1732 including instructions, and the instructions may be executed by the processor in the processing component 1722 of the device 1700 to perform the above described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Other embodiments of the disclosure will be apparent to those skilled in the art from consideration of the specification and practice of the disclosure. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for adjusting a discontinuous reception (DRX) related parameter, applied to user equipment (UE), the method comprising:
    determining whether a number of times that a low battery saving request has been sent reaches a count threshold when obtaining a power saving trigger;
    when the number of the times that the low battery saving request has been sent does not reach the count threshold, sending the low battery saving request to a base station;
    receiving a low battery saving response fed back by the base station; and
    adjusting the DRX related parameter according to the low battery saving response.

2. The method of claim 1, wherein adjusting the DRX related parameter comprises:
    adjusting the DRX related parameter to prolong a DRX cycle.

3. The method of claim 1, wherein the adjusted DRX related parameter is included in at least one of the low battery saving request or the low battery saving response.

4. The method of claim 1, wherein the DRX related parameter comprises at least one of:
    a threshold of a UE-on counter;
    a frequency of the UE-on counter; or
    a DRX cycle parameter,
    wherein the DRX cycle parameter comprises at least one of:
    a long DRX cycle parameter in a connected state; or
    a short DRX cycle parameter in a connected state.

5. The method of claim 1, further comprising:
    sending a power recovery request to the base station when obtaining a recovery trigger;
    receiving a power recovery response fed back by the base station; and
    adjusting the DRX related parameter to a normal value according to the power recovery response.

6. The method of claim 1, further comprising:
    after sending the low battery saving request to the base station, receiving a low battery saving rejection message fed back by the base station; and
    aborting adjustment of the DRX related parameter according to the low battery saving rejection message.

7. The method of claim 1, further comprising:
    before sending the low battery saving request to the base station, determining whether a timer expires, the timer starting timing from a last time when the low battery saving request is sent or a time when a low battery saving rejection message is received,
    wherein sending the low battery saving request to the base station comprises:
    sending the low battery saving request to the base station when the timer expires.

8. A method for adjusting a discontinuous reception (DRX) related parameter, applied to a base station, the method comprising:
    receiving a low battery saving request sent by user equipment (UE);
    determining whether a number of times that the low battery saving request has been received exceeds a preset count threshold;
    when the number of times that the low battery saving request has been received does not exceed the preset count threshold, feeding back a low battery saving response to the UE to instruct the UE to adjust the DRX related parameter; and
    when the number of times that the low battery saving request has been received exceeds the preset count threshold, feeding back a low battery saving rejection message to the UE to stop the UE from adjusting the DRX related parameter.

9. The method of claim 8, wherein feeding back the low battery saving response to the UE to instruct the UE to adjust the DRX related parameter comprises:
    feeding back the low battery saving response to the UE to instruct the UE to adjust the DRX related parameter to prolong a DRX cycle.

10. The method of claim 8, wherein the adjusted DRX related parameter is included in at least one of the low battery saving request or the low battery saving response.

11. The method of claim 8, wherein the DRX related parameter comprises at least one of:
    a threshold of a UE-on counter;
    a frequency of the UE-on counter; or
    a DRX cycle parameter,
    wherein the DRX cycle parameter comprises at least one of:
    a long DRX cycle parameter in a connected state; or
    a short DRX cycle parameter in a connected state.

12. User equipment (UE), comprising:
    a processor; and
    a memory configured to store instructions executable by the processor,
    wherein the processor is configured to:
    determine whether a number of times that a low battery saving request has been sent reaches a count threshold when a power saving trigger is obtained;
    when the number of the times that the low battery saving request has been sent does not reach the count threshold, send the low battery saving request to a base station;
    receive a low battery saving response fed back by the base station; and
    adjust a DRX related parameter according to the low battery saving response.

13. The UE of claim 12, wherein the processer is further configured to:
   adjust the DRX related parameter to prolong a DRX cycle.

14. The UE of claim 12, wherein the adjusted DRX related parameter is included in at least one of the low battery saving request or the low battery saving response.

15. The UE of claim 12, wherein the DRX related parameter comprises at least one of:
   a threshold of a UE-on counter;
   a frequency of the UE-on counter; or
   a DRX cycle parameter,
   wherein the DRX cycle parameter comprises at least one of:
   a long DRX cycle parameter in a connected state; or
   a short DRX cycle parameter in a connected state.

16. The UE of claim 12, wherein the processer is further configured to:
   send a power recover request to the base station when a recovery trigger is obtained;
   receive a power recovery response fed back by the base station; and
   adjust the DRX related parameter to a normal value according to the power recovery response.

* * * * *